United States Patent [19]

Vinal

[11] Patent Number: 4,698,711

[45] Date of Patent: Oct. 6, 1987

[54] SIMPLIFIED, SHIELDED TWIN-TRACK READ/WRITE HEAD STRUCTURE

[75] Inventor: Albert W. Vinal, Cary, N.C.

[73] Assignee: International Business Machines Corporation, Armonk, N.Y.

[21] Appl. No.: 782,661

[22] Filed: Oct. 2, 1985

[51] Int. Cl.$^4$ .............................................. G11B 5/147
[52] U.S. Cl. ...................................... 360/113; 360/126
[58] Field of Search ........................ 360/113, 119, 126

[56] References Cited

U.S. PATENT DOCUMENTS 4,315,291 2/1982 Lazzari ................................. 360/113
4,599,668 7/1986 Griffith ................................ 360/113

Primary Examiner—A. J. Heinz
Attorney, Agent, or Firm—Edward H. Duffield

[57] ABSTRACT

This invention is an improvement in the design of a twin-track read/write heads. The present design eliminates the reluctance gap between the U-shaped write drive coil structure and the U-shaped magnetic sensor and coupling leg structure in that patent. A new structure incorporating two separate coupling legs with a gap at the pole tip interface to the magnetic recording medium for reading and writing is utilized. The new design also incorporates a back gap to adjust the overall reluctance and proportional effect of flying height gap variations. In addition, magnetic shields are introduced to further reduce the effects of fringe field interference at the write head to media interface.

6 Claims, 8 Drawing Figures

SIMPLIFIED, SHIELDED TWIN-TRACK READ/WRITE HEAD STRUCTURE

RELATED APPLICATION DATA

This application is related to my own co-pending, commonly assigned application Ser. No. 584,364, filed Feb. 28, 1984, now U.S. Pat. No. 4,626,946. It is also related to a twin-track recording system as disclosed in my commonly assigned issued U.S. Pat. No. 4,484,238 which fully describes a twin-track reading and writing method for magnetic recording.

FIELD OF THE INVENTION

This invention relates generally to magnetic recording read/write heads, their structures and to read/write magnetic sensor applications.

OBJECTS OF THE INVENTION

The novel concepts of twin-track recording were first described in my aforementioned commonly assigned U.S. Pat. No. 4,484,23. A novel read/write head structure was developed for utilizing the methods of that patent and is contained in the co-pending, commonly assigned application Ser. No. 584,364, now U.S. Pat. No. 4,626,946 mentioned above. Optimization of the design considerations for a specific twin-track solid state read/write head structure have led to the discovery of improvements in structure and function that decrease the sensitivity of the read/write head to flying height variations and to decreased interference from adjacent data fields on the magnetic medium as well as to reductions in pole tip fringe field interference effects.

It is an object of the present invention to provide an improved read/write solid state magnetic sensor head structure for magnetic recording in twin track data systems.

BRIEF DESCRIPTION OF THE DRAWINGS

The simplified and improved read/write head structure having lower sensitivity to flying height variations and having reduced fringe field interference effects is further described with reference to a preferred embodiment as illustrated in the drawings, in which.

SUMMARY

The foregoing and still other objects that have not been specifically enumerated are met in a preferred embodiment of the invention in which the reluctance gap that existed in my previous design, as shown in my co-pending, commonly assigned application Ser. No. 584,364, between the magnetic drive structure and the magnetic sensor structure, has been eliminated or greatly reduced. In addition, a back gap having a major portion of reluctance in the magnetic circuit as compared with the reluctance of the read/write media gap or the reluctance through the magneto resistive sensor is included. By making the back gap a relatively large reluctance as compared with the reluctance of the read/write pole tip to media interface gap, minor variations in flying height, which will vary the reluctance present at the read/write head tips, represent only a very small portion of the overall reluctance of the magnetic circuit. As a consequence, with a given MMF driving the read/write head in the write mode, very little variation in flux coupling to the magnetic medium occurs. Similarly, in read back operations, very little variation occurs for the same reason. The back gap also magnetically shunts the MR sensor, but its reluctance is high compared to the reluctance of the MR sensor so that most of the flux from the media during read back is concentrated through the relatively lower reluctance magnetic sensor portion of the path rather than being shunted through the high reluctance air gap path. By proper sizing of the coupling legs of the read/write head, a flux concentration effect through the magnetic sensor can also be achieved as shown in this design which greatly improves read back flux coupling sensitivity. A further improvement is brought about by the addition of the magnetic shields which virtually eliminate all inter-bit interference effects and eliminate any adjacent track coupling signals. The shields are of magnetically permeable material and are spaced from the vertical coupling legs by a distance equal to the length S of a written bit on the medium. Their function is to prevent stray fields from passing through the magneto resistive sensor which is located across the coupling legs of the magnetic read/write head at a distance relatively remote from the medium surface. Particularly for the case of relatively long written 1s or 0s or successions of 1s and 0s, the inter-bit interference mode in vertical recording can cause interference as described in greater detail below. The shields virtually eliminate all of such isolated "long bit" interference response as a function of flying height.

DETAILED SPECIFICATION

Figure 1A:
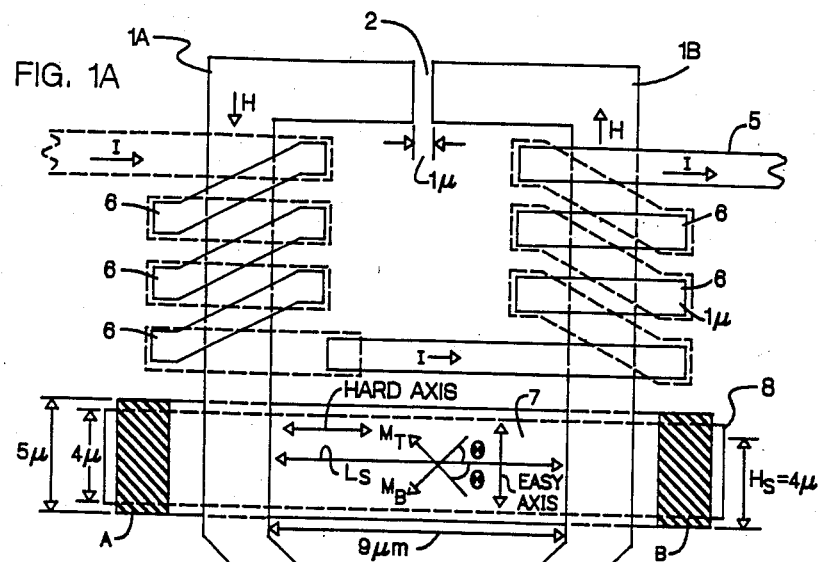
FIG. 1A illustrates the structure of an improved twin-track read/write head design according to the invention, but with the magnetic shielding elements removed for clarity.
Figure 1B:
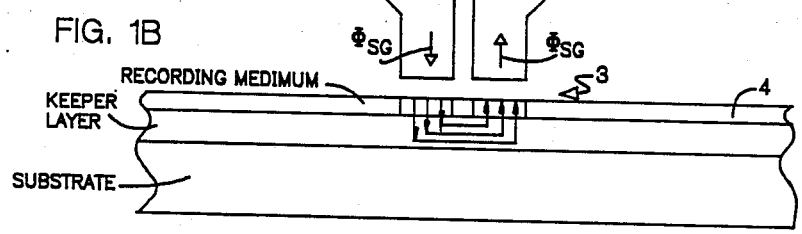
FIG. 1B illustrates a horizontal sectional elevation view through a magnetic recording medium having a keeper layer and a substrate to better define the mode of operation of the subject read/write head.
Figure 1C:
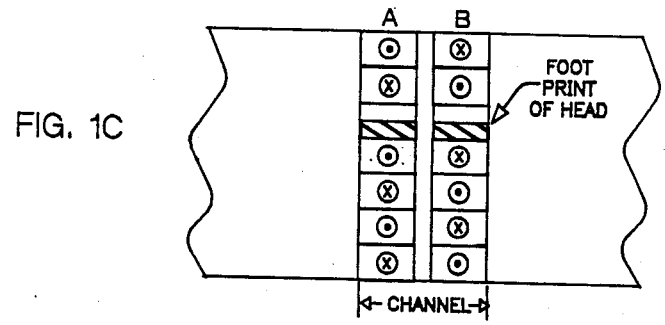
FIG. 1C illustrates the plan view of a twin-track recording and the position of the head "footprint" as it would appear over the recorded magnetic medium.

The improved twin-track read/write head structure will now be described in greater detail with reference to a preferred embodiment thereof. Turning to FIGS. 1A through 1C, the basic twin-track recording concept with a twin-track recording read/write head of improved design is shown in conjunction to a magnetic medium traveling in a direction normal to plane of page in FIG. 1B and with a plan view of the recorded track in FIG. 1C.

As described in my aforementioned U.S. Pat. No. 4,484,238, twin-track recording concepts embrace the simultaneous writing of two parallel tracks with oppositely poled portions of vertically oriented magnetization within the magnetic medium being written or read. The pair of tracks thus formed creates a single data channel and provides a closed magnetic path through the medium keeper layer as shown in FIG. 1B. This is true for both reading and writing functions. During the writing mode of operation, flux will flow from a pole tip of one vertical coupling leg of the read/write head in FIG. 1A into the medium as shown in FIG. 1B magnetizing the same in the vertical orientation. From there, the flux flows onward into the keeper layer below the vertical magnetic medium and back out through the vertical medium, polarizing it in the opposite polarity and on into the adjacent pole tip of the magnetic read/write head. The direction of the write flux field will depend on the direction of current passed through the writing coil in the read/write head. The reluctance of this portion of the flux path is dominated by the air gap between the surface of the medium and the pole tips of the read/write head. This gap is commonly referred to as the flying height gap.

During reading operations, flux from the medium is magnetically conducted through the vertical magnetic legs of the structure and concentrated through a coupled film magneto resistive sensor as described in my co-pending, commonly assigned application Ser. No. 584,364. The polarity of the read back flux depends upon the pair polarity of the magnetization regions written within the oppositely poled track regions straddled by the pole tips.

In FIG. 1A, two vertically oriented permalloy legs, or other similar highly magnetically permeable material, are shown as coupling legs 1A and 1B. There is a back gap 2 separating the remote ends of the coupling legs 1A and 1B at the top of the structure. During a writing operation, the reluctance of this back gap is such greater than the reluctance of the flying height gap 3. This allows for a relatively constant writing flux density to be coupled to the medium 4 in a manner which is virtually independent of flying height variations. The reason is that the overall magnetic circuit including the electromagnetic drive coil 5 composed of individual windings 6 about the coupling legs 1A and 1B includes both the reluctance of the back gap 2, the reluctance of the magneto resistive sensor 7 and the reluctance of the read/write head gap 3. Since the flux coupled to the magnetic medium 4 is dependent upon the flux flowing in the overall magnetic circuit, which is dependent upon the reluctance of the path, it is evident that minor variations in flying height reluctance due to variations in flying height gap 3 will not contribute to large overall variations in reluctance in the magnetic reluctance circuit. There is very little reluctance to account through the shunting connection of the magnetic sensor 7 across the coupling legs 1A and 1B during the writing mode for the reason explained in my previously mentioned co-pending application, i.e., the magneto resistive sensor structure is saturated during writing and conducts no more flux. It represents, once saturated, a very high magnetic reluctance which forces most of the magnetic flux to pass through the pole pieces 1A and 1B at the interface to the medium 4. During read back, with the magneto resistive sensor biased in the reading mode, the sensor 7 has a relatively low reluctance as compared with the air gap 2 at the back of the read/write head or with the flying height gap 3. Thus, during the read back mode, the back gap 2 also regulates the amount of flux coupled and concentrated from the medium 4 into the sensor 7 through the coupling legs 1A and 1B.

The magnetic read/write head structure shown in FIG. 1A is intended to be fabricated by integrated circuit techniques on the surface of a silicon wafer or the like. Such a wafer is not shown in FIG. 1A for clarity, but the method of constructing the read/write head will be briefly given as follows.

First, the surface of the semiconductive or ceramic wafer is cleaned and a layer of silicon dioxide insulator is laid down. Then a photoresistive emulsion is placed on the surface. An aperture or photographic mask having the layout of the bottom portion of each of the magnetic drive coils 6 as shown within the dashed lines in FIG. 1A will then be exposed, developed and etched away to expose areas of the insulative surface of the substrate. Then, metal such as copper or gold or aluminum is vapor deposited through the apertures in the photoresist material to form the beginning portion of the conductive windings 6. A new layer of silicon dioxide insulator is then laid down overall and a further emulsion and mask step is carried out to lay out the position of the magnetic coupling legs 1A and 1B which are then exposed and etched and the metal for the coupling legs then laid down in the openings created on the surface of the silicon dioxide insulator. Another layer of silicon dioxide is then laid down, appropriately masked and etched to open up areas for the interconnection of the remaining portion of the drive coils 6 as shown in the solid lines in FIG. 1A which are then deposited similarly to complete the windings for the writing coil 5. During this step the bottom layer of the coupled film magneto resistive sensor 7 is also laid out as a ribbon area of nickel cobalt or nickel iron magneto resistive material approximately five microns in height and $\frac{3}{4}$ mil or 18 microns in length as shown in FIG. 1A. This will lie on the top surface of silicon dioxide insulator in close physical proximity to the underlying magnetic coupling legs 1A and 1B so as to be in close magnetic circuit contact therewith. There follows another layer of silicon dioxide overall with a masking and etching step in an emulsion to open up a window to lay down a magneto resistive insulator shield of titanium or the like of slightly smaller width, such as 4 microns, and slightly greater length, such as 30 microns, as shown by the layer 8 in FIG. 1A. This may be followed the another deposition of nickel cobalt or nickel iron magneto resistive sensor material of the same dimension as the first layer which is in physical contact with the lower magneto resistive sensor layer at the edges at the top and bottom of the magnetically insulative titanium layer which forms, in effect, a closed loop of magneto resistive material about a core of magnetically insulative titanium. The titanium is electrically conductive as are the magneto resistive portions. Areas A and B are then deposited with gold to make good ohmic contact and provide a place for attaching sensor leads to develop a voltage across the magneto resistive sensor.

While this brief description will be clear to those of ordinary skill in the this art, several aspects of the dimensions involved are important and will now be described.

First, the elimination of Barkhausen noise generated in magneto resistive sensors during read back intervals is a fundamental design consideration. The principle origin of this type of sensor noise is magnetic domain wall motion that occurs during energization of the sensor. Minimizing the 180 degree magnetic domain wall formation will depend upon termination of the demagnetizing field sources for both the at-rest and energized attitudes of magnetization within the magnetic films that comprise this structure. The magnetically closed magneto resistive structure shown in FIG. 1A terminates any demagnetizing fields by allowing a complete coupling between the two films only at the edges. Exchange coupling between the major area of the films is prevented by approximately a 300 Angstrom thickness of electrically conductive, but non-magnetic, metal such as titanium. Titanium eliminates the exchange coupling as described in my previously noted co-pending application. The easy axis of magnetization in the magnetic films forming the sensor 7 lies perpendicular to the length of the sensor as shown in FIG. 1A. The ends of the magnetically sensitive sensor structure 7 are insulated as noted previously from the coupling legs 1A and 1B by approximately a 1000 Angstrom thick layer of silicon dioxide or the like. The contacts A and B are gold plated and lie on the titanium layer to facilitate electrical connections. During operation, a constant current source is connected between the terminals A and B to supply a bias current that accomplishes two tasks.

First, a current with a density $J_s$ is passed through both of the MR film layers forming the MR sensor 7. This forms a closed easy access mutual magnetizing field in each layer. This will force an anti-parallel magnetic couple to exist as described in my aforementioned patent application. The direction of rest magnetization within the top and bottom magnetic film layers will lie anti-parallel with respect to one another and parallel with respect to the easy magnetic axis. The anti-parallel vector couple is the result of the magnetizing field in the top magnetic film due to current flowing in the bottom film and vice versa. Current flowing in the titanium film sandwiched between the two magnetic film layers aids in the formation of the anti-parallel magnetization alignment. Most of the bias current will flow through the magnetic layers forming the magneto resistive structure rather than through the center layer or titanium sandwich since the resistivity of magnetic material films is much lower than that of titanium.

The second task accomplished by the bias current is that the current density $J_s$ flowing in each magnetic film layer determines the magnitude of the read back signal that will be experienced for a given sensor with a length $L_s$ and a magneto resistive change $\Delta R$ whenever the magneto resistive materials are exposed to a magnetic field. The maximum magneto resistive change $\Delta R$ is approximately 2.5% of the static resistance of the coupled film sensor. A sensor current of about 15 ma will produce a maximum signal response of 1 mv.

As described in my previously noted co-pending application, when the read/write head shown in FIG. 1A is operating in the read mode, it is necessary to bias the rest angle $\theta_0$ of magnetization within the film sensor away from the easy axis. Biasing of the magnetic vectors within the top and bottom films of the coupled film magneto resistive structure 7 is accomplished by passing a longitudinal magnetic field through the sensor. This, in turn, is caused by passing a constant DC current through the write coil 5 during the read back mode of operation. The direction of the current I in coil 5 is arbitrary. The nominal bias angle of $\theta_0$ is approximately 45 degrees from the hard axis which is the same axis through which the electric current passes during the bias operation. The hard axis is shown parallel with the long dimension $L_s$ of the sensor structure 7 in FIG. 1A.

During reading, flux fields from the magnetic medium 4 are coupled to the pole tips of the coupling legs 1A and 1B and conducted upward, coupled into the magneto resistive sensor layers and passed through the magneto resistive sensor in the direction of the long or hard axis which results in torquing the magnetic vectors of the anti-parallel couple within the upper and lower films of the structure through a small angle different from that of $\theta_0$ at which the couple was biased to rest. This results in a resistive change and a concurrent change in the output voltage experienced at terminals A and B in response to the electrical current flowing through the sensor 7.

In operation during writing, the flux shunting effect of magnetic films of the sensor 7 operates as a flux switch. When magnetization within the sensor 7 is rotated so that the magnetic couple lies parallel with the hard magnetic axis, the field shunting effect of the sensor itself saturates and allows no further increase in flux to pass through it. Any increase in flux generated by the writing coil 5 will then be allowed to be directly coupled to the medium 4 for magnetizing it with the data to be written. For lower coil currents through coil 5 at the general reading bias levels, magnetization within the sensor 7 is rotated to approximately 40 degrees or greater from the hard axis. The sensor reluctance in this state is quite low and most of the magnetizing field generated by the writing coil 5 passes through the sensor 7 with very little leakage flux being allowed to flow in the medium 4.

The contributions of the back gap 2 may now be understood in greater detail with respect to this preferred embodiment. The reluctance of the back gap is proportional to the length of the air gap between the ends of the coupling legs 1A and 1B shown by the gap 2. The gap is typically made approximately 1 micrometer in length and, assuming equal dimensions of the end faces of the legs at the gap 2 and at the medium gap 3, the reluctance of this gap will be much greater than that at the medium interface gap 3, which gap is typically on the order of only about two tenths of a micron. Thus, the overall magnetic reluctance of the circuit comprising the coupling legs 1A and 1B, the shunting sensors 7 and the read/write gap 3 is dominated by the reluctance of gap 2 since the reluctance of the sensor 7 during the writing mode is so high as to form an essentially open magnetic path in parallel across the two legs 1A and 1B. Thus, the gaps 2 and 3 are in a magnetic series circuit with gap 2 having the dominant portion of reluctance. This provides a means of creating a relatively constant writing field at the medium that is independent of minor flying height fluctuations. In addition, the reluctance of gap 2 is quite high when compared with the active reluctance of the magneto resistive sensor pair 7 during the read back mode when the biasing of the magnetic vectors is away from the easy axis. During the read back mode, the result is that the flux shunt effect of the MR sensor 7 illustrates a much lower reluctance than the back gap 2, with the consequent result that most of the coupled flux from the medium 4 will pass through the coupling legs 1A and 1B and into the coupled film magnetic sensor 7.

A concentration effect on flux is also produced in the preferred embodiment by appropriately sizing the dimensions of the coupling legs 1A and 1B relative to the thickness and size of the magneto resistive sensing layers in MR sensor 7. By assuming that no leakage through the air between the couplings legs 1A and 1B is present, and that the sensor flux flowing through the couplings legs is essentially equal since very little will be flowing through the back gap 2, and further assuming that the width of the coupling legs 1A and 1B is approximately the same as the height of the sensor $H_s$ or about 4 microns, it can be shown that the flux density $B_s$ through the sensor is equal to the flux density in the coupling legs $B_{in}$ times the ratio of the thickness of the coupling legs to the thickness of the sensor. With a typical coupling leg thickness of approximately 4000 Angstroms and a total sensor thickness of about 600 Angstroms, assuming two 300 Angstrom thick layers to make up sensor 7, the flux concentration passing through the sensitive area of sensor 7 is approximately 6.6 times the medium flux density passing through the coupling legs 1A or 1B during read back. In fact, the sensor will experience over six times the flux density being experienced at the pole tips of the read/write head at its interface at gap 3 to the recording surface 4.

Figure 2:
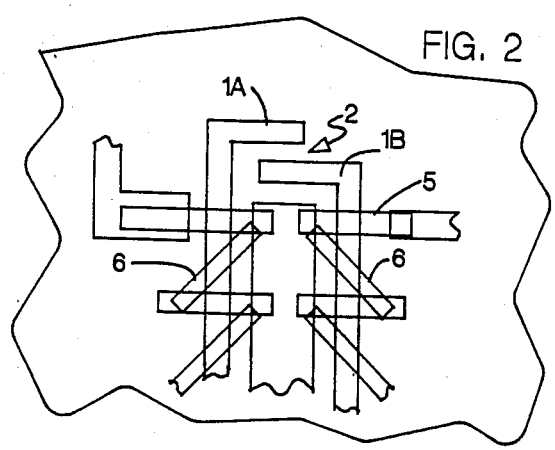
FIG. 2 illustrates an improvement in the area of the back gap of the improved read head structure of FIG. 1 as an alternative design.

Turning to FIG. 2, a variation of design in the area of the back gap 2 for the coupling legs 1A and 1B is shown. Due to the difficulty of fabricating a 1 micron gap consistently, it has been found that designing the ends of the coupling legs 1A and 1B to overlap each other slightly at a more sustainable spacing of two microns or more is an easier way of structuring the total reluctance of the back gap 2. The overlapping area may then be easily trimmed or etched away to control the overall reluctance which is dependent upon the physical area of the ends or edges which interface each other between the coupling legs 1A and 1B.

Figure 3:
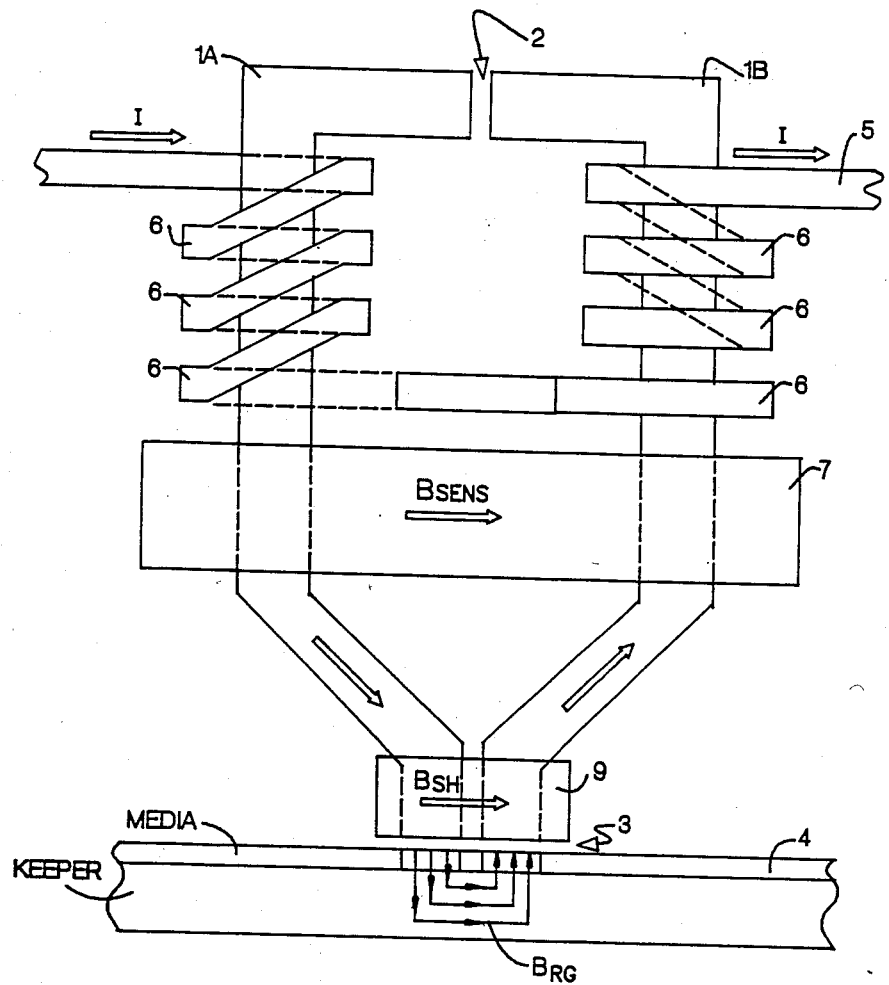
FIG. 3 illustrates the improved read/write head as shown in FIG. 1 with the magnetic pole shields in place.

Turning to FIG. 3, another drawing of the twin-track read/write head structure in FIG. 1A is illustrated in conjunction with the magnetic recording medium and its keeper layer 4 and 8 respectively. In the discussion given so far, the head has been unshielded, but it will be observed that magnetically permeable shields 9 are shown in place in FIG. 3. Each shield 9 consists of a thin plate of magnetically permeable material which is electrically isolated from the coupling legs 1A and 1B by additional layers of silicon dioxide or the like. One magnetically permeable layer 9 overlies eacn side, i.e., top and bottom of the pole tips in the area of the media to read/write head gap 3 as shown in FIG. 3. It has been found that it may be necessary in some events to provide magnetic shields for twin-track read/write head designs to minimize the isolated bit effects from the long magnet field effects that can recur during recorded channels with long runs of 1s or 0s. Long magnet field effects result from a series of bits with the same binary content. The shielded twin track head structure virtually eliminates any interference between bits caused by coupling to the sensor 7 directly through the air from adjacent tracks or adjacent bits on the track. In addition, the already minimal fringe writing field generated by vertical twin-track read/write head structures such as this are further suppressed or eliminated by the shields 9 as applied in the area of the pole tips from the coupling legs 1A and 1B.

Figure 4A:
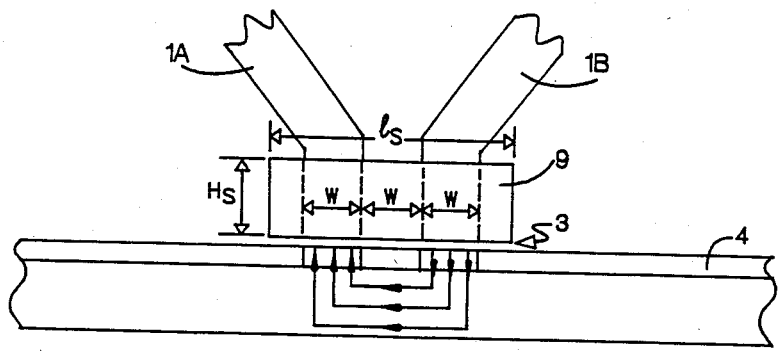
FIG. 4A illustrates the vicinity of the pole tips in FIG. 3 with the dimensions of the shield elements relative to the pole widths and data recording areas as illustrated.
Figure 4B:
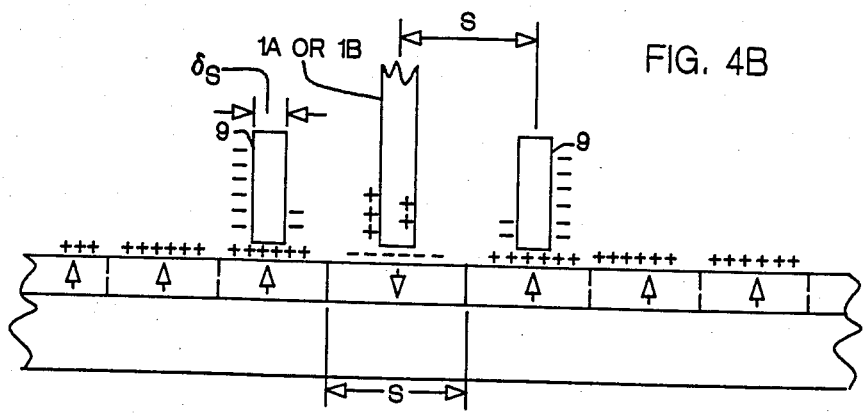
FIG. 4B illustrates a side view in partial schematic form to show the spacing of the magnetic shields from the magnetic coupling legs in the read head structure.
Figure 4C:
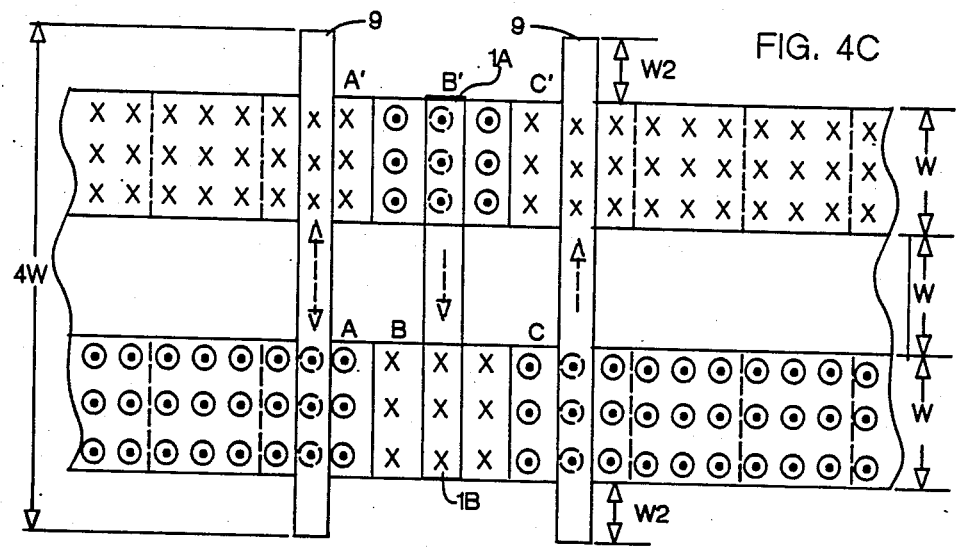
FIG. 4C illustrates a schematic top or plan view of the shields in position on either side of the area in which the coupling legs and read head structure interface the twin recorded tracks.

The shielded version of the twin-track head is illustrated in greater detail ih FIGS. 4A through 4C. FIG. 4 illustrates just the shielded portion of the head in greater detail. There are three views as noted. The twin-track head pole tips are shown from the front view in FIG. 2A which is similar to a portion of FIG. 3 or FIG. 1A and is similarly numbered where appropriate.

Turning to FIG. 4B, the shields 9 are shown at an end or side view taken from the right or the left as of the structure in FIG. 4A. It may be seen that the shields 9 are removed from the coupling legs by a distance S which is equal to the interbit spacing S in the magnetic recorded medium 4. This space is created as mentioned previously by laying down repetitive layers of silicon dioxide until a sufficient depth is created. It will be noted in FIG. 4B that the shields 9 effectively sandwich the pole tips of the coupling legs 1A and 1B in the vicinity of the throat region of the head as shown in FIG. 4A. A nominal thickness for each shield 9 is the same as the thickness as the vertical couplings legs 1A or 1B which have previously been described as 4000A. Shields 9 will also consist of the same magnetic material as the vertical coupling legs and will have a height $H_s$ equal to the throat height of the vertical coupling legs 1A and 1B. A total shield length of approximately four times the width W, where W is the width of a data channel including the intervening space between two data tracks, is preferred. This is seen better in FIG. 4C. The total channel width is approximately 3W and the shields 9 extend beyond the channel on either side by a distance of $\frac{1}{2}$W for safety.

Referring again to FIGS. 4A and 4B, the shields 9 are shown spaced apart from the vertical coupling legs 1A and 1B by the nominal center to centerseparation distance S between the vertical coupling legs and the shields as equal to the minimum length S of the written bit in the magnetic medium 4. The function of the magnetic shield 9 is to prevent any stray fields from the medium 4 from passing through or reaching the magneto resistive sensor 7 which is located remote from the medium surface and bridges the vertical couplings legs 1A and 1B as previously shown.

FIG. 4C illustrates the isolated bit data stream. The combination of successive 1s and 0s in the worst case condition as depicted may lead to the worst amount of interbit interference mode of operation in vertical recording. The data track magnetization polarities shown in FIG. 4C are self-explanatory. The desired signal coupled through the sensor that straddles the data tracks is from the vertical bit regions identified as B' to B. This corresponds to the flux arrow printing down in FIG. 4C where the coupling legs 1A and 1B are superimposed over the diagram. The shields 9 on either side of the twin recorded track pole pieces conduct flux also in the direction from A to A' and C to C' as illustrated. Their presence eliminates any degenerate flux coupling through the sensor from A to C' or C to A' that would result in loss of data signal or increase of noise. This is the worst case degenerate condition experienced by twin-track head utilizing the system as shown.

It may also be shown that isolated bit interference response varies as a function of flying height and that when the shields 9 are not present, there exists a finite flying height where the DC polarity of the sensed signal of an isolated bit actually reverses due to the effects of isolated bit interference. With the shields in place, no reversal in signal polarity occurs at any altitude until signals finally are no longer coupled to the sensor.

A possible disadvantage of a shielded structure is that there is a loss of flux through the shields 9 during the writing mode. It has been determined that a 2250 Gauss medium field can be generated during writing with the shielded structure in place given approximately a 175 milliamp writing current. This current will require a six turn coil 5 and a flying height of approximately 0.2 micrometers with a medium thickness in the magnetic media 4 of approximately 0.4 micrometers. The coil current required to bias the sensor 7 during such an operation is approximately 12 milliamps. The 2250 Gauss field is more than sufficient to write all presently known magnetic medium materials.

The presence of the shields 9 also greatly reduces the fringing gradient effects from the twin-track head during writing which may cause interference in adjacent tracks or portions of the medium. The primary reason is that the main field generated by the twin-track read/write head passes through the medium rather than bypassing the medium as in the case for ordinary longitudinal or lateral gap head recording systems. It is the fringe fields in longitudinal recording that ordinarily perform the writing function by design and these have a relatively poor spatial gradient. In contrast, vertical twin track recording systems couple most of the flux from the read or writing head pole tips directly into the medium. There is some shielding effect nevertheless and this can be reduced to levels well below the coersive force of the magnetic medium 4 at distances as close to the edge of the recorded track as 0.4 micrometers with the total fringe field virtually eliminated at a distance away from the written track approximately equal to the width of the track for all usable flying heights for writing.

Having thus described my invention with reference to a preferred embodiment thereof, it will be obvious to those of ordinary skill in the art that a variety of departures from the specific structure may be envisioned in terms of dimensions of the elements and in relative placement of the writing and bias coil, design o the pole tips of the coupling legs, the thicknesses and orientations of the magneto resistive film layers and the like without departing from the spirit and scope of this invention wherefor what is contained in the claims that follow is intended by way of description and not limitation.

What is claimed is:

1. An improved twin-track magnetic read/write head comprising a magnetically permeable member having two separate legs, each said leg having two ends, and said head also having a connecting portion comprising a magnetic flux sensor for sensing magnetic flux coupled from a recording medium by said legs and flux sensor joining said two legs; and
   an electromagnetic coil wrapped about a section of said magnetically permeable member and wherein;
   first ends of each of said two legs are arranged to vertically confront a planar magnetic medium and are configured such that imaginary vertical projections of said first ends of said legs' upon the plane of the magnetic medium produce, upon relative motion between the medium and the legs in a horizontal plane, separate parallel tracks in said medium, each said imaginary vertical projection having a maximum dimension which is aligned along a line which is generally normal to the direction of motion, whereby magnetic flux patterns may be recorded in said medium in two separate tracks by applying electrical current to said electromagnetic coil and magnetic flux patterns in said separate tracks may be read by coupling flux from said medium through the ends of said legs and therefrom through said connecting portion comprising said magnetic sensor.

2. Apparatus as described in claim 1, wherein:
   a first magnetic reluctance path exists through the second said ends of said legs of said magnetically permeable member; and
   a second magnetic reluctance path exists between the ends of said connecting member and said legs of said magnetically permeable member; and
   during reading, said first and second reluctance paths have reluctance values such that said first reluctance is greater than said second reluctance.

3. Apparatus as described in claim 2, wherein:
   said connecting member comprises a magnetic sensor means for sensing magnetic flux coupled from said magnetic medium by said two legs of said magnetically permeable member and conducted on an axis of said magnetic sensor.

4. Apparatus as described in claim 3, wherein:
   said sensor comprises a pair of magnetized magnetoresistive thin films in which the magnetic vectors are coupled in an anti-parallel fashion and wherein the easy axis of magnetization in each film is transverse to the axis of signal current conduction through said films.

5. Apparatus as described in claims 1 or 2 or 3 or 4 and further comprising:
   a pair of magnetically permeable members electrically insulated from said two legs and positioned in close proximity to said first ends thereof, each said magnetically permeable member being spaced apart from said legs by a lateral distance approximately equal to the smallest recorded bit length in said magnetic medium.

6. Apparatus as described in claim 1 or 2 or 3 or 4, wherein:
   said second ends of said legs are arranged to be spaced apart by an electrically insulated gap therebetween, each leg end comprising a portion thereof running parallel to the other said leg end and spaced apart therefrom to create a magnetic reluctance gap therebetween.

* * * * *